Sept. 3, 1968   C. R. BAILEY   3,399,903
PORTABLE HOLDER FOR REFUSE CANS
Filed Aug. 8, 1967
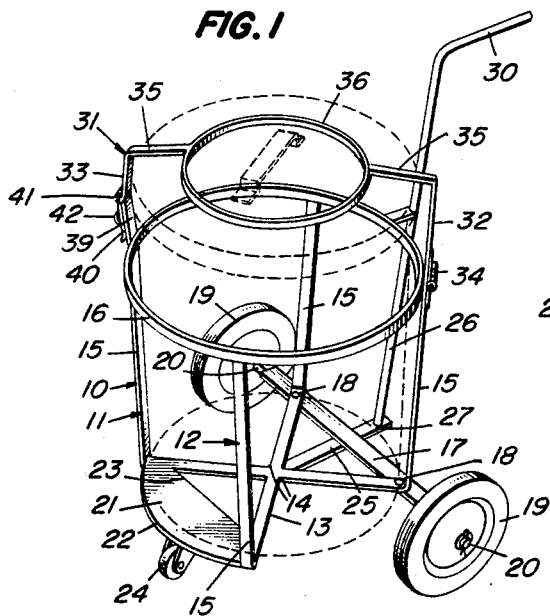
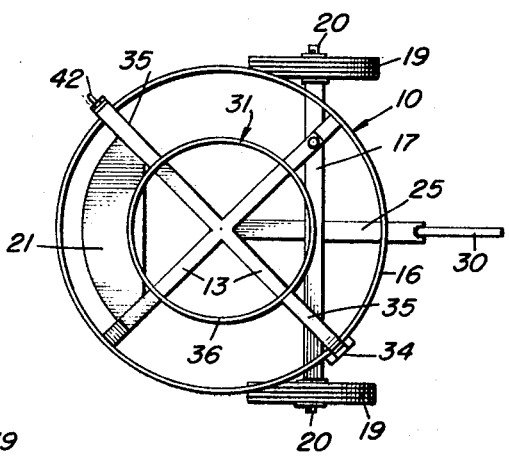
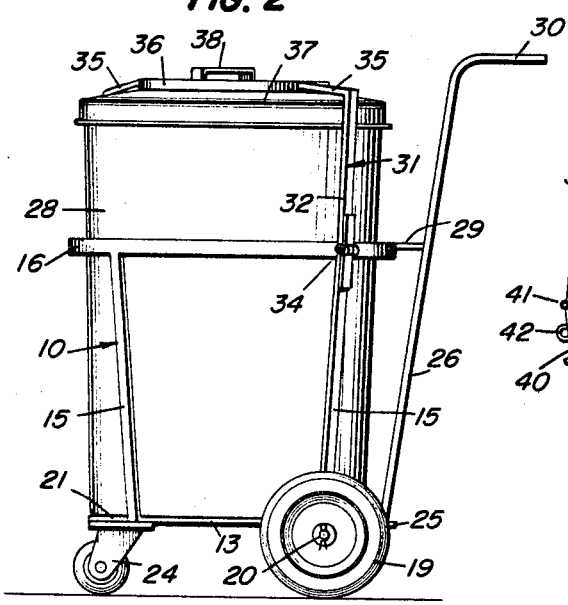
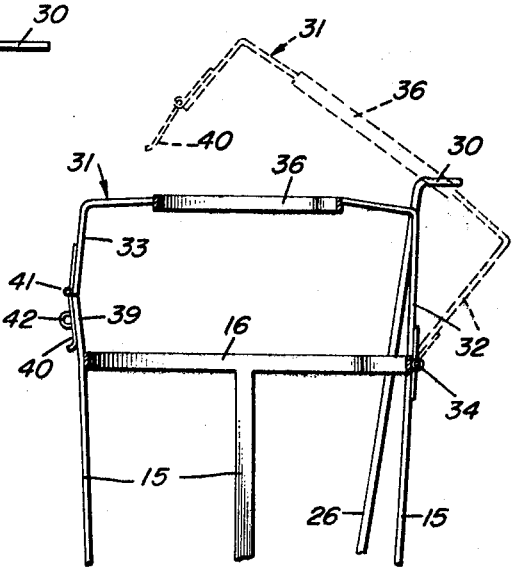
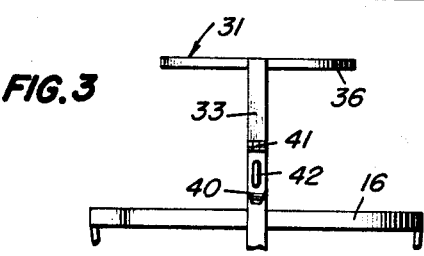
INVENTOR
Charles R. Bailey
BY  B. P. Fishburne, Jr.
ATTORNEY 3,399,903
PORTABLE HOLDER FOR REFUSE CANS
Charles R. Bailey, 3 Clarkin St., Charleston
Heights, S.C. 29405
Substituted for abandoned application Ser. No. 35,222,
June 10, 1960. This application Aug. 8, 1967, Ser. No. 684,090
3 Claims. (Cl. 280—47.34)

ABSTRACT OF THE DISCLOSURE

A portable wheeled holder or carrier for refuse cans characterized by a can lid securing yoke and latch hinged to the body of the holder which prevents accidental spilling of the contents.

---

This application is a substitute application for my previous application Ser. No. 35,222, filed June 10, 1960, for Portable Holder for Refuse Cans, now abandoned.

This invention relates to a portable holder for a refuse can or the like.

An object of the invention is to provide a simplified, economical and extremely sturdy holder for garbage cans and the like, including means for firmly securing the lid to the can so that the lid cannot be displaced by dogs.

A further object is to provide a garbage or refuse can holder equipped with wheels and a handle to facilitate moving the same readily when desired.

Other objects and advantages of the invention will become apparent during the course of the following description.

In the accompanying drawings forming a part of this application and in which like numerals are employed to designate like parts throughout the same, FIGURE 1 is a perspective view of a portable holder for garbage cans according to the invention;

FIGURE 2 is a side elevation of the holder with a garbage can mounted therein;

FIGURE 3 is a fragmentary side elevation of the holder looking at the locking hasp;

FIGURE 4 is a plan view of the holder; and

FIGURE 5 is a fragmentary central vertical section through the holder with parts in elevation.

In the drawings, wherein for the purpose of illustration is shown a preferred embodiment of the invention, the numeral 10 designates generally an upright body portion including a pair of crossed U-shaped strap members 11 and 12, arranged at right angles to each other as shown. The strap members 11 and 12 include bottom horizontal bars 13 which intersect or cross at the center of the holder and extend radially equidistantly from the center, as shown in the drawings. The bars 13 are preferably rigidly connected by welding at 14 at the center of the holder, as indicated. The strap members 11 and 12 further include upstanding legs 15 of equal length and formed integral with the bars 13 and projecting above the latter for a considerable distance in preferably upward slight divergent relation. A horizontal annular band 16 is rigidly secured by welding to the tops of the legs 15, as shown. The body portion 10 of welded construction is thus rendered very rigid and yet relatively lightweight.

An axle bar 17 spans the rear ends of the horizontal bars 13 in underlying relation thereto, and the axle bar is welded or riveted to the ends of the bars 13 as at 18, and has its ends projecting laterally outwardly of the adjacent legs 15 as shown in the drawings. Transporting wheels 19 are freely journaled on axle extensions 20 of the axle bar 17 and these wheels project below the horizontal bars 13 to support the garbage can holder in spaced relation to the ground as shown in FIGURE 2. The wheels 19 are disposed upon opposite sides of the holder adjacent the rear of the same.

A horizontal plate or web 21 having a forward circularly curved margin 22 and a rear transverse edge 23 is rigidly secured by welding or the like between the forward portions of the horizontal bars 13, remote from the axle bar 17. This construction renders the body portion 10 highly rigid and sturdy. A single caster wheel 24 is swiveled upon the bottom of the forward plate 21 at the transverse center of the holder and midway between the larger rear wheels 19 to facilitate turning and manipulating the portable holder.

A horizontal rearwardly extending longitudinal brace 25 is welded to the bottoms of the bars 13 at their point of crossing and also welded to the bottom of axle bar 17 at the longitudinal center of the latter. The brace 25 extends rearwardly of the axle bar 17 as shown and is arranged at right angles thereto. An elongated upstanding slightly rearwardly inclined handle bar 26 has its lower end secured by welding at 27 to the rear end of the brace 25, and this handle bar 26 projects for a substantial distance above the annular band or ring 16 and terminates near and above the top of the garbage can 28, FIGURE 2. Intermediate its ends, the handle bar 26 is further rigidly connected to the rear side of the horizontal band 16 by a short brace 29, welded thereto and welded to the handle bar. The top end of the handle bar 26 carries a short rearwardly extending horizontal handle 30 integral therewith.

A generally inverted U-shaped lid securing yoke 31 is provided above the body portion 10, and this yoke includes depending substantially vertical leg sections 32 and 33, arranged adjacent to a diagonally opposite pair of the legs 15. The lower end of the yoke leg section 32 is hingedly secured to the horizontal band 16, directly above the adjacent leg 15 as indicated at 34. The hinge 34 and leg section 32 are spaced circumferentially forwardly of the handle bar 26 approximately forty-five degrees, see FIGURE 4, and the leg sections 32 and 33 are disposed diametrically opposite to each other and adjacent a pair of the legs 15, as stated.

The yoke 31 further embodies substantially horizontal radial arm portions 35 integral with the leg sections 32 and 33 and extending diagonally of the holder, FIGURE 4. An annular horizontal ring 36 is rigidly secured to the arm portions 35 by welding, and this ring is disposed centrally directly above the crossing point of the bars 13. The ring 36 is adapted to engage the top of the garbage can lid 37 to secure the latter in place upon the garbage can, and the ring 36 receives the lid handle 38 within it as shown in FIGURE 2.

The depending leg section 33 is somewhat shorter than the leg section 32, FIGURE 5, and abuts the top of an upstanding extension 39, formed by a continuation of the adjacent forward leg 15 of the body portion 10. A suitable hasp 40 is hingedly secured at 41 to the leg section 33 for coaction with a forwardly projecting eye 42 on the extension 39. A padlock, not shown, may be introduced through the eye 42 when the hasp 40 is positioned as shown in full lines in FIGURE 5, to thereby releasably lock the yoke 31 in the closed or lid securing position. The yoke 31 is vertically swingable upon the hinge 34 as shown in broken lines in FIGURE 5 to permit removal of the lid 37 or removal of the entire can 28 from the holder. The arrangement is such that the vertically swingable yoke 31 readily clears the handle bar 26 when the yoke is swung openly through an arc of 180 degrees from its position shown in FIGURE 1. When the yoke is swung to the fully open position, the leg section 32 will abut the outer side of the adjacent leg 15, which leg serves as a stop to prevent the yoke from falling below an approximately horizontal open position.

In use, the garbage or refuse can 28 is received within the open top of the holder body portion 10 and rests upon the horizontal bars 13 at the bottom of the holder. The can 28 projects a substantial distance above the fixed ring 16 as shown in FIGURE 2, and the inverted U-shaped yoke 31 is engageable over the upper portion of the can and over the lid 37 to secure the latter in the manner shown and described.

The holder may be painted or formed from corrosion-resistant metal so that it will not be readily effected by the elements. It forms a highly useful device for supporting a garbage can or the like in a fixed location and the wheels and caster render the holder readily movable or portable as desired. Obviously, the holder may be made in various sizes to accommodate different sizes of cans.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:
1. A portable garbage can holder comprising a pair of crossed rigidly connected upstanding substantially U-shaped strap members including bottom horizontal bars extending diagonally of the line of movement of the holder, an annular member rigidly secured to the tops of said strap members, a transverse horizontal bar spanning the lower rear corners of said bottom horizontal bars and rigid therewith, wheels journaled upon said axle bar outwardly of said lower rear corners, a transverse horizontal plate element rigidly interconnecting the forward lower corners of said bottom horizontal bars, a caster swiveled to the bottom of said plate element and disposed substantially midway between said wheels and forwardly thereof, an inverted U-shaped yoke disposed above said annular member and extending diagonally of the line of movement of the holder and including a top substantially horizontal part to clampingly engage the lid of the garbage can for securing the latter, one end of said yoke hingedly secured to said annular member, latch means for the other end of said yoke to detachably secure the same to one of said strap members when the yoke is in closed position, an upstanding handle for the holder at the rear side of the same substantially midway between said wheels, and brace means interconnecting said handle with said annular member and axle bar.

2. A portable garbage can holder comprising crossed substantially horizontal bottom bars rigidly connected with each other and spaced substantially ninety degrees circumferentially and extending diagonally of the line of movement of said holder, upstanding legs carried by the ends of said bars and integral therewith, an annular member rigidly secured to the tops of said legs and being substantially horizontal, an axle bar spanning the rear ends of said crossed bars transversely and extending outwardly of said rear ends, wheels journaled upon the ends of said axle bar, a transverse horizontal plate rigidly interconnecting the forward ends of said crossed bars, a caster swiveled upon the bottom of said plate midway between said forward ends and wheels, a horizontal longitudinal brace rigidly secured to said crossed bars at their point of crossing and intersecting said axle bar and rigidly secured thereto and extending rearwardly of the axle bar, an upstanding handle bar having its lower end secured to said brace rearwardly of the axle bar, said handle bar extending for a substantial distance above the annular member and having a top rearwardly extending substantially horizontal handle extension, a horizontal brace rigidly interconnecting the handle bar and the rear side of said annular member intermediate the ends of the handle bar, and an inverted U-shaped yoke extending diagonally of said holder above the annular member and having one end hingedly secured to the annular member in circumferentially spaced relation to the handle bar and adapted to clampingly engage the garbage can lid.

3. A portable garbage can holder according to claim 2, and wherein said yoke comprises a substantially horizontal top member having a ring connected therein to receive the handle of the garbage can lid and depending leg sections integrally secured to said top member substantially in vertical alignment with one pair of said upstanding legs, and latch means for releasably securing one depending leg section of the yoke to one of said upstanding legs.

References Cited
UNITED STATES PATENTS

| | | | |
|---|---|---|---|
| 2,513,630 | 8/1947 | Elliott | 248—146 X |
| 2,745,676 | 5/1956 | Scott | 280—47.26 |
| 3,214,120 | 10/1965 | McKee | 280—47.26 X |
| 3,346,271 | 10/1967 | Parsons | 280—47.34 |

BENJAMIN HERSH, *Primary Examiner.*

J. SIEGEL, *Assistant Examiner.*